(12) United States Patent
Kwon et al.

(10) Patent No.: US 10,101,986 B2
(45) Date of Patent: Oct. 16, 2018

(54) METHOD AND APPARATUS FOR EXECUTING APPLICATIONS

(71) Applicant: Samsung Electronics Co., Ltd., Gyeonggi-do (KR)

(72) Inventors: Jungho Kwon, Gyeonggi-do (KR); Chunki Bae, Seoul (KR); Gwanggeol Kim, Gangnam-gu (KR); Sieun Jung, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 237 days.

(21) Appl. No.: 15/005,201

(22) Filed: Jan. 25, 2016

(65) Prior Publication Data
US 2016/0216955 A1    Jul. 28, 2016

(30) Foreign Application Priority Data

Jan. 26, 2015  (KR) .......................... 10-2015-0012048

(51) Int. Cl.
| | |
|---|---|
| *G06F 8/61* | (2018.01) |
| *H04L 29/06* | (2006.01) |
| *H04L 29/08* | (2006.01) |
| *G06F 9/445* | (2018.01) |
| *G06F 9/455* | (2018.01) |

(52) U.S. Cl.
CPC .................. *G06F 8/63* (2013.01); *G06F 8/61* (2013.01); *G06F 9/445* (2013.01); *G06F 9/45558* (2013.01); *H04L 63/102* (2013.01); *H04L 67/06* (2013.01); *H04L 67/1095* (2013.01); *H04L 67/1097* (2013.01); *G06F 2009/45562* (2013.01)

(58) Field of Classification Search
CPC .. G06F 9/445; G06F 9/45558; G06F 21/6218; G06F 8/63; G06F 8/61; G06F 8/65; H04L 63/102; H04L 63/08–63/10
See application file for complete search history.

(56) References Cited

U.S. PATENT DOCUMENTS

| | | | | |
|---|---|---|---|---|
| 8,959,248 | B2 * | 2/2015 | Moromisato | ..... H04L 29/08846 370/341 |
| 9,734,325 | B1 * | 8/2017 | Neumann | ............. H04L 9/0877 |
| 2009/0133129 | A1 * | 5/2009 | Jeong | ...................... G06F 21/10 726/27 |
| 2013/0326513 | A1 * | 12/2013 | Shlomai | .................. G06F 9/455 718/1 |
| 2014/0020086 | A1 * | 1/2014 | Tanikawa | ................ G06F 21/31 726/17 |

(Continued)

FOREIGN PATENT DOCUMENTS

KR   10-1081489 B1   11/2011

*Primary Examiner* — Hadi S Armouche
*Assistant Examiner* — Shaqueal D Wade
(74) *Attorney, Agent, or Firm* — Cha & Reiter, LLC.

(57) ABSTRACT

An apparatus comprising: a memory; at least one processor operatively coupled to the memory, configured to: execute a plurality of platforms that are different from each other in at least one of type and version, each of the platforms being associated with one or more respective applications; and perform an operation including at least one of deleting a first platform, installing a second platform, deleting a first application from one of the platforms, and installing a second application in one of the platforms.

16 Claims, 11 Drawing Sheets

(56) References Cited

U.S. PATENT DOCUMENTS

2015/0074745 A1* 3/2015 Stern ...................... H04L 63/20
          726/1
2015/0347170 A1* 12/2015 Mohammed .............. G06F 8/65
          718/1
2015/0350101 A1* 12/2015 Sinha ........................ G06F 9/00
          709/226

* cited by examiner

METHOD AND APPARATUS FOR EXECUTING APPLICATIONS

CLAIM OF PRIORITY

This application claims priority from and the benefit under 35 U.S.C. § 119(a) of Korean Patent Application No. 10-2015-0012048, filed on Jan. 26, 2015, which is hereby incorporated by reference for all purposes as if fully set forth herein.

BACKGROUND

1. Field of the Disclosure

The present disclosure relates to electronic devices, in general, and more particularly to a method apparatus for executing applications.

2. Description of the Prior Art

Applications that are installed in an electronic device are available within the functional scope provided by a platform of the electronic device. That is, a specific application is made to conform to each platform, and each application is separately produced to correspond to each of a plurality of platforms. Therefore, even with the same application, the application is not compatible with a different platform.

Meanwhile, a conventional application streaming technology, upon the receipt of a request from an electronic device, executes an application that is compatible with a platform that is installed in a server, and transmits an application execution image to the electronic device. Accordingly, the type of application, which can be executed in the server, relies on the type of application that is provided by the platform of the server. In addition, the application executed in the server can use only the files that are stored in the server, and cannot use the files stored in the electronic device.

SUMMARY

According to aspects of the disclosure, an apparatus is provided comprising: a memory; at least one processor operatively coupled to the memory, configured to: execute a plurality of platforms that are different from each other in at least one of type and version, each of the platforms being associated with one or more respective applications; and perform an operation including at least one of deleting a first platform, installing a second platform, deleting a first application from one of the platforms, and installing a second application in one of the platforms.

According to aspects of the disclosure, an electronic device is provided comprising: a display unit; a memory; and at least one processor operatively coupled to the memory, configured to: execute an application client associated with an application; receive an application execution image from a virtual device manager server through a service address for executing the application; and display the application execution image on the display unit.

According to aspects of the disclosure, a method is provided comprising: executing a plurality of platforms that are different from each other in at least one of type and version; receiving, from an external device, a request for executing an application associated with one of the platforms; executing the application in response to the request for executing the application; and transmitting, to the external device, a service address for receiving an application execution image that is produced as a result of executing the application.

According to aspects of the disclosure, a method is provided for use in an electronic device, comprising: transmitting, to a virtual device manager server, a request for executing an application, the request containing an application ID associated with the application; receiving, from the virtual device manager server, a service address for executing the application in response to the request; receiving an application execution image from a virtual system included in the virtual device manager server by using the service address; and displaying the application execution image on a display unit of the electronic device.

BRIEF DESCRIPTION OF THE DRAWINGS

The above features, and advantages of the present disclosure will be more apparent from the following detailed description in conjunction with the accompanying drawings, in which.

DETAILED DESCRIPTION

Figure 1:
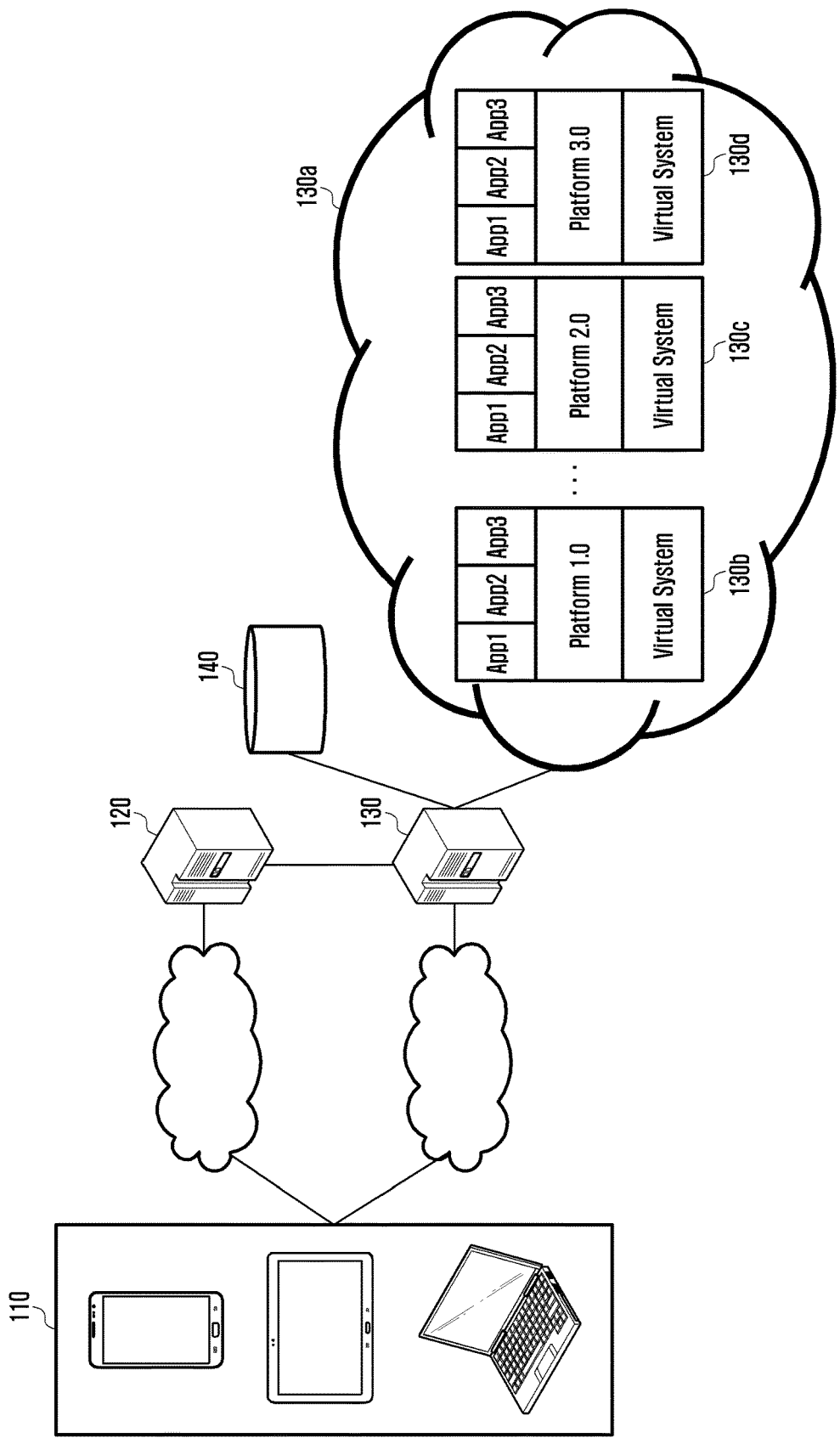
FIG. 1 is a diagram of an example of a network environment, according to various embodiments.

Hereinafter, the present disclosure will be described with reference to the accompanying drawings. However, various embodiments of the present disclosure are not limited to a specific implementation form and it should be understood that the present disclosure includes all changes and/or equivalents and substitutes included in the spirit and scope of various embodiments of the present disclosure. In connection with descriptions of the drawings, similar components are designated by the same reference numeral.

In various embodiments of the present disclosure, the terms such as "include" or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In various embodiments of the present disclosure, the expression "or" or "at least one of A or/and B" includes any or all of combinations of words listed together. For example, the expression "A or B" or "at least A or/and B" may include A, may include B, or may include both A and B.

The expression "1", "2", "first", or "second" used in various embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device indicate different user devices although both of them are user devices. For example, without departing from the scope of the present disclosure, a first structural element may be referred to as a second structural element. Similarly, the second structural element also may be referred to as the first structural element.

When it is stated that a component is "coupled to" or "connected to" another component, the component may be directly coupled or connected to another component or a new component may exist between the component and another component. In contrast, when it is stated that a component is "directly coupled to" or "directly connected to" another component, a new component does not exist between the component and another component.

The terms used in describing various embodiments of the present disclosure are only examples for describing a specific embodiment but do not limit the various embodiments of the present disclosure. Singular forms are intended to include plural forms unless the context clearly indicates otherwise.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present description.

An electronic device according to various embodiments of the present disclosure may be a device including a projection function. For example, the electronic device may be one or a combination of a smartphone, a tablet Personal Computer (PC), a mobile phone, a video phone, an e-book reader, a desktop PC, a laptop PC, a netbook computer, a Personal Digital Assistant (PDA), a camera, a wearable device (for example, a Head-Mounted-Device (HMD) such as electronic glasses, electronic clothes, and electronic bracelet, an electronic necklace, an electronic appcessory, an electronic tattoo, and a smart watch.

According to some embodiments, the electronic device may be a smart home appliance having a projection function. The smart home appliance may include at least one of a Television (TV), a Digital Video Disk (DVD) player, an audio player, an air conditioner, a cleaner, an oven, a microwave oven, a washing machine, an air cleaner, a set-top box, a TV box (for example, Samsung HomeSync™, Apple TV™, or Google TV™), game consoles, an electronic dictionary, an electronic key, a camcorder, and an electronic frame.

According to some embodiments, the electronic device may include at least one of various types of medical devices (for example, Magnetic Resonance Angiography (MRA), Magnetic Resonance Imaging (MRI), Computed Tomography (CT), a scanner, an ultrasonic device and the like), a navigation device, a Global Positioning System (GPS) receiver, an Event Data Recorder (EDR), a Flight Data Recorder (FDR), a vehicle infotainment device, electronic equipment for a ship (for example, a navigation device for ship, a gyro compass and the like), avionics, a security device, a head unit for a vehicle, an industrial or home robot, an Automatic Teller Machine (ATM) of financial institutions, and a Point Of Sale (POS) device of shops.

According to some embodiments, the electronic device may include at least one of furniture or a part of a building/structure, an electronic board, an electronic signature receiving device, a projector, and various types of measuring devices (for example, a water meter, an electricity meter, a gas meter, a radio wave meter and the like) including a projection function. The electronic device according to various embodiments of the present disclosure may be one or a combination of the above-described various devices. Further, the electronic device according to various embodiments of the present disclosure may be a flexible device. It is apparent to those skilled in the art that the electronic device according to various embodiments of the present disclosure is not limited to the above-described devices.

The present embodiment allows the user of the electronic device to freely use applications that are specialized for various types and versions of platforms. That is, the present embodiment provides an apparatus and a method that enables the execution of a variety of applications regardless of a platform of the electronic device. For example and without limitation, the term "platform" may refers to a hardware architecture in which software can be executed and/or software framework (including an application program framework) that is available for the hardware architecture. For example, the platform may include the architecture of the computer, an operating system (OS), a program language, a related run-time library, or a GUI. As another example, and without limitation, the term "platform" may refer to an operating system and/or any other suitable type software environment.

In the present embodiment, the user may execute a desired application by installing an application that is modified to conform to a platform desired by the user without changing a platform of the electronic device. According to aspects of the disclosure, some of the applications described below may be "streaming applications." That is, the applications are installed in a virtual system for each platform, and when the electronic device requests, the virtual system executes the application corresponding to a requested platform to then transmit an application execution image to the electronic device so that the user may be provided with the same application execution environment as the actual execution of the applications in the electronic device.

FIG. 1 is a diagram of an example of a network environment between, according to various embodiments.

Referring to FIG. 1, the electronic device 110 may include any suitable type of device, such as a smartphone, a tablet, a desktop computer, or a laptop computer. In operation, the electronic device 110 may transmit a request to an entitlement server 120 for the registration of a virtual device. The request may be transmitted in response to a predetermined user input. Along with the request, the electronic device 110 may transmit an identifier corresponding to an account allocated to the electronic device 110. The identifier may be one that is uniquely allocated to the electronic device 110, and it may be used as an identifier for identifying the electronic device 110. In response to the request, the electronic device 110 may receive, from the entitlement server 120, an authorization key and access information for accessing a virtual device manager server 130. The electronic device 110 may store the authorization key in a storage unit.

In addition, the electronic device 110 may transmit a request to the virtual device manager server 130 for the creation of a virtual device, which contains the authorization key and the access information. The electronic device 110 may include an App manager to process commands associated with the virtual device and an App player for controlling the execution of the applications. The electronic device 110 may receive a virtual device ID from the virtual device manager server 130 in response to the request for the creation of the virtual device. The electronic device 110 may store the received virtual device ID in the storage unit. Afterwards, the electronic device 110 may use the virtual device ID to install, execute, or delete applications.

For example, the electronic device 110 may transmit a request for the execution of an application for a desired platform to the virtual device manager server 130 through the entitlement server 120. More particularly, the electronic device 110 may transmit a request that includes platform information and an application ID together with the virtual device ID. In response to the request, the electronic device 110 may receive a service address (e.g., URL), which is related to the execution of the application from the virtual device manager server 130, and may receive an execution image of the application through the service address in order to thereby display the same on a display unit. Thus, the electronic device 110 may easily execute the desired application without changing the platform or locally installing the application of a platform that is different from that of the electronic device 110.

The entitlement server 120 may be a server that is configured to authorize the registration of the virtual device, the installation and deletion of the platform, or the installation, deletion, and execution of applications. When the entitlement server 120 receives a service request identifying the account associated with the electronic device 110, the entitlement server 120 may determine whether or not the account associated with the electronic device 110 is valid, and may authorize the electronic device 110 to register the virtual device. If the account is valid, the entitlement server 120 may issue an authorization key to the electronic device 110. The electronic device 110 may then use the authorization key to access the virtual device manager server 130.

The entitlement server 120 may be integrated into the virtual device manager server 130, or may be implemented as a separate device. The entitlement server 120 may provide the access information with respect to the virtual device manager server 130 to only the electronic device of which the account is verified so that the security of the virtual device manager server 130 may be maintained. The entitlement server 120 may authenticate a device (for example, the electronic device 110) that requests the installation, deletion, or execution of the applications, or the installation of the platform, and may provide the access information with respect to the virtual device manager server 130.

The virtual device manager server 130 may be a server that manages one or more of the virtual device, the platform, and application information. In operation, the virtual device manager server 130 may receive the request for the creation of the virtual device, and may issue the virtual device ID to the electronic device 110. Although in this example the virtual device manager server 130 issues a single virtual device ID, in some implementations the virtual device manager server 130 may issue multiple virtual device IDs. In instances in which a single virtual device ID is issued, the virtual device ID may correspond to one or more pieces of platform information and application information. In the case of issuing a plurality of virtual device IDs to a single electronic device, a single virtual device ID may correspond to one piece of platform information and application information. After issuing the virtual device IDs, the virtual device manager server 130 may associate the virtual device IDs with the authorization key in the database 140. In addition, the virtual device manager server 130 may transmit supportable platform information and application information to the electronic device 110 upon the receipt of a request from the electronic device 110.

The virtual device manager server 130 may include a virtual system 130a including a plurality of platforms that are different in type and version and a plurality of applications that are executed in the plurality of platforms. In some implementations, a single virtual system may have a single platform installed therein, and a single platform may have one or more applications installed therein. For example, Platform 1.0 may be installed in a virtual system 130b, and applications, such as App 1, App 2, or App 3, may be installed in Platform 1.0. Platform 2.0 may be installed in a virtual system 130c, and applications, such as App 1, App 2, or App 3, may be installed in Platform 2.0. Platform 3.0 may be installed in a virtual system 130d, and applications, such as App 1, App 2, or App 3, may be installed in Platform 3.0. When a request for the execution of the application of a specific platform is received from the electronic device 110, the virtual device manager server 130 may provide the electronic device 110 with a service address, by which the electronic device 110 may access the virtual system and execute the application of the requested platform, in order to thereby control to transfer an application execution image from the virtual system to the electronic device 110 through the service address.

According to aspects of the disclosure, a user may own a single electronic device, and may request the execution of an application that is executable in another device of a different platform. In such instances, the electronic device may transmit to the virtual device manager server 130 the virtual device ID and information on the platform and application to be executed. Additionally or alternatively, the user may own a smartphone, a tablet, and a notebook, and may receive respective virtual device IDs issued to each device of the user. When the user requests, by using the smartphone adopting the first platform, the execution of an application that is executable in a tablet adopting the second platform, a virtual device ID related to the tablet along with information on the platform and application to be executed may be transmitted to the smartphone. Additionally or alternatively, when the user requests, by using the tablet adopting the second platform, the execution of an application that is executable in the laptop computer adopting the third platform, a virtual device ID related to the laptop computer and information on the platform and application to be executed may be transmitted to the tablet.

Figure 2:
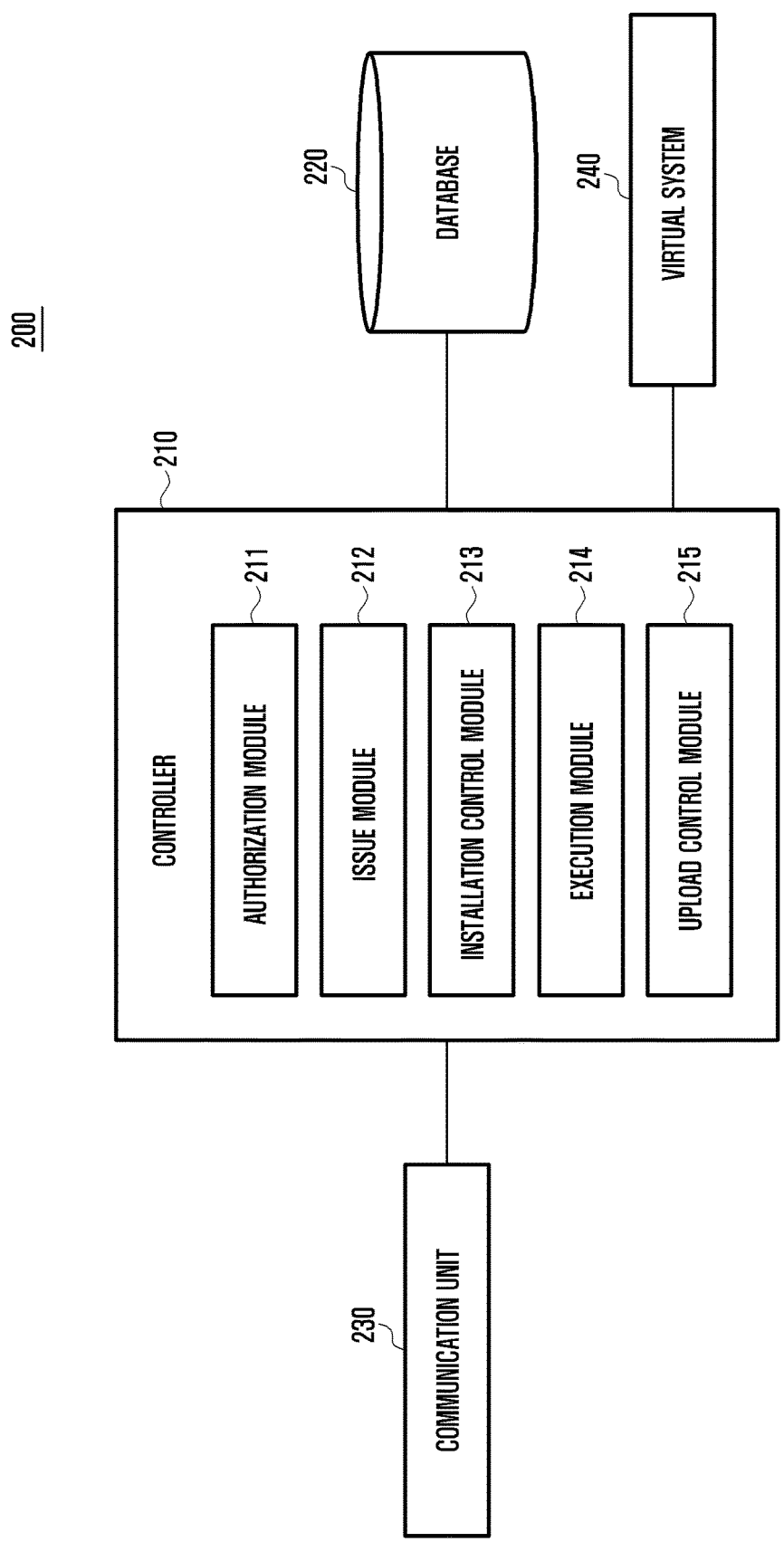
FIG. 2 is a diagram of an example of a virtual device manager server, according to various embodiments.

FIG. 2 is a diagram of an example of a virtual device manager server, according to various embodiments.

As illustrated, the virtual device manager server 200 (or a virtual device management device) may include a controller 210, a database 220, a communication unit 230, and a virtual system 240.

The virtual system 240 may include a plurality of platforms installed therein, and one or more applications may installed in each platform. For example, the first virtual system may include version 1.0 of a particular platform, the second virtual system may include version 2.0 of the platform, and the third virtual system may include version 3 of the platform.

The controller 210 controls the overall operation of the virtual device manager server 200 and signal flows between internal elements thereof, and processes data. The controller 210 may include an authorization module 211, an issue module 212, an installation control module 213, an execution module 214, and an upload control module 215.

The authorization module 211 may authorize the registration of the virtual device, the installation and deletion of the platform, or the installation, deletion, and execution of the application. The authorization module 211 may receive a service request that contains the account associated with the electronic device 110 through the communication unit 230, and may determine that the service request is for the registration of a virtual device. The authorization module 211 may determine whether or not the account associated with the electronic device 110 is valid, and may authorize the electronic device 110 to register the virtual device. If the account is valid, the authorization module 211 may issue the authorization key to the electronic device 110. Afterwards, the electronic device 110 may use the authorization key to access the virtual device manager server 200. The authorization key may be a pre-processing operation for obtaining a virtual device ID. When a request for the installation or deletion of the platform is received from a platform provider, the authorization module 211 may authenticate the platform provider, and may authorize the installation or deletion of the platform by the platform provider. In addition, when a request for the installation, deletion, or execution of the application is received from the electronic device 110, the authorization module 211 may authenticate the electronic device 110, and may authorize the installation, deletion, or execution of the application by the electronic device when the electronic device is successfully authenticated.

The issue module 212 may issue a virtual device ID when a virtual device registration request containing the authorization key is received from the electronic device 110. The issue module 212 may issue the virtual device ID based on the authorization, after which the issue module 212 may transmit the virtual device ID to the electronic device 110. The virtual device ID may be allocated a virtual physical space for executing the application of a desired platform regardless of the platform of the electronic device 110. The issue module 212 may map the authorization key to the virtual device ID and store them in the database 220. In an embodiment, the account associated with the electronic device 110 may be received together with the authorization key. In such instances, the issue module 212 may map the account associated with the electronic device 110, the authorization key, and the virtual device ID to each other and store them in the database 220. The issue module 212 may issue a single virtual device ID to a single electronic device, or may issue a plurality of the virtual device IDs to a single electronic device.

The installation control module 213 may control the installation of the platform and applications. For example, when a new platform is released, the platform provider may install the new platform in the virtual device manager server 200. More particularly, in some implementations, the installation control module 213 may receive a request for installing the platform from the platform provider. If the validity of the platform provider is confirmed by the authorization module 211, the installation control module 213 may receive, from the platform provider, installation information associated with the new platform together with the authorization key that is issued by the authorization module 211. For example, if the validity is confirmed, the installation control module 213 may provide an installation address (e.g., the address of an FTP server) for installing the new platform through the authorization module 211. FTP (File Transfer Protocol) is a protocol used to send files. The installation control module 213 may configure the installation address in order to receive a file for the installation of the platform. The installation address is intended for the connection with the virtual system 240 in which the platform can be installed. The installation information may include one or more of an indication of the type the new platform, an indication of the version of the new platform, or files for installing the new platform. The installation control module 213 may receive the installation information associated with the new platform by using the installation address, and may install the new platform in the virtual system 240.

The installation control module 213 may receive a request for the installation of the application from the electronic device 110. When the installation request is received, the installation control module 213 may receive installation information associated with the application to be installed together with a virtual device ID. The installation information may include platform information, or application file names for the execution of the application. The installation control module 213 may allocate an application ID based on the installation information. The application ID may identify the platform and the application to be executed. The installation control module 213 may provide the application ID and an installation address (e.g., an FTP address) for installing the application through the authorization module 211. The installation address may be used to connect with the virtual system 240 in which the application may be installed. The installation control module 213 may receive a file for installing the application through the installation address, and may install the application in the virtual system 240.

In general, applications may be divided into a client that provides a UI (User Interface) for interacting with the application and a host which executes the application. Accordingly, the installation control module 213 may install a host corresponding to the logic in the virtual system 240, while also installing the client on the electronic device 110.

The installation control module 213 may receive a request for deleting the application from the electronic device 110. When the deletion request is received, the installation control module 213 may receive an application ID to be deleted through the authorization module 211. The installation control module 213 may determine whether or not the application ID has been installed in the virtual system 240 in order to validate the application ID. If the application ID is valid, the installation control module 213 may transmit to the electronic device 110 a deletion address for deleting the application. The deletion address may be a URL for connecting to the virtual system 240 in which the application has been installed. The installation control module 213 may receive a control command for deleting the application at the deletion address, and may delete the application from the virtual system 240 in response. As described above, if the host corresponding to the logic is deleted from the virtual system 240, the electronic device 110 may also delete the client for providing the UI from the storage unit.

The execution module 214 may receive a request for executing the application from the electronic device 110. When the application execution request is received from the user, the electronic device 110 may transmit a request to the virtual device manager server 200 for a services address for the execution of the application, which includes the requested application ID. That is, when the execution request is received, the execution module 214 may receive the application ID through the authorization module 211. Afterwards, the execution module 214 may transfer, to the electronic device 110, the service address (e.g., a URL for the access to the virtual system 240) and a local address (e.g., an address by which the virtual system 240 may access the file stored in the electronic device 110), by which the application corresponding to the application ID can be executed, through authorization module 211. At this time, the authorization module 211 may transfer the service address and the local address together with the authorization key to the electronic device 110. The execution module 214 may transmit and receive control commands related to the execution of the application and UI-related data by using the service address.

The upload control module 215 may receive a local file stored in the electronic device 110 through the local address. If local resources are required in the electronic device 110 when executing the application, the upload control module 215 may receive the local resources in the electronic device 110, and may share the same with the executed application.

The database 220 may store various information items related to the electronic device, such as an identifier corresponding to the account associated with the electronic device, the authorization key, and the virtual device ID. Moreover, the database 220 may map any of these information items to one another, such that any one of the information items may be used as a search key for retrieving one or more of the rest. For example, in some implementations, the database 220 may map a single virtual device ID with one or more application IDs corresponding to a single platform, and may store the same.

The communication unit 230, under the control of the controller 210, may perform data communication with an external device through a network (e.g., a mobile communication network, such as LTE, or a wireless/wired LAN). The communication unit 230 may perform data communication with the electronic device 110 or a platform provider.

Figure 3:
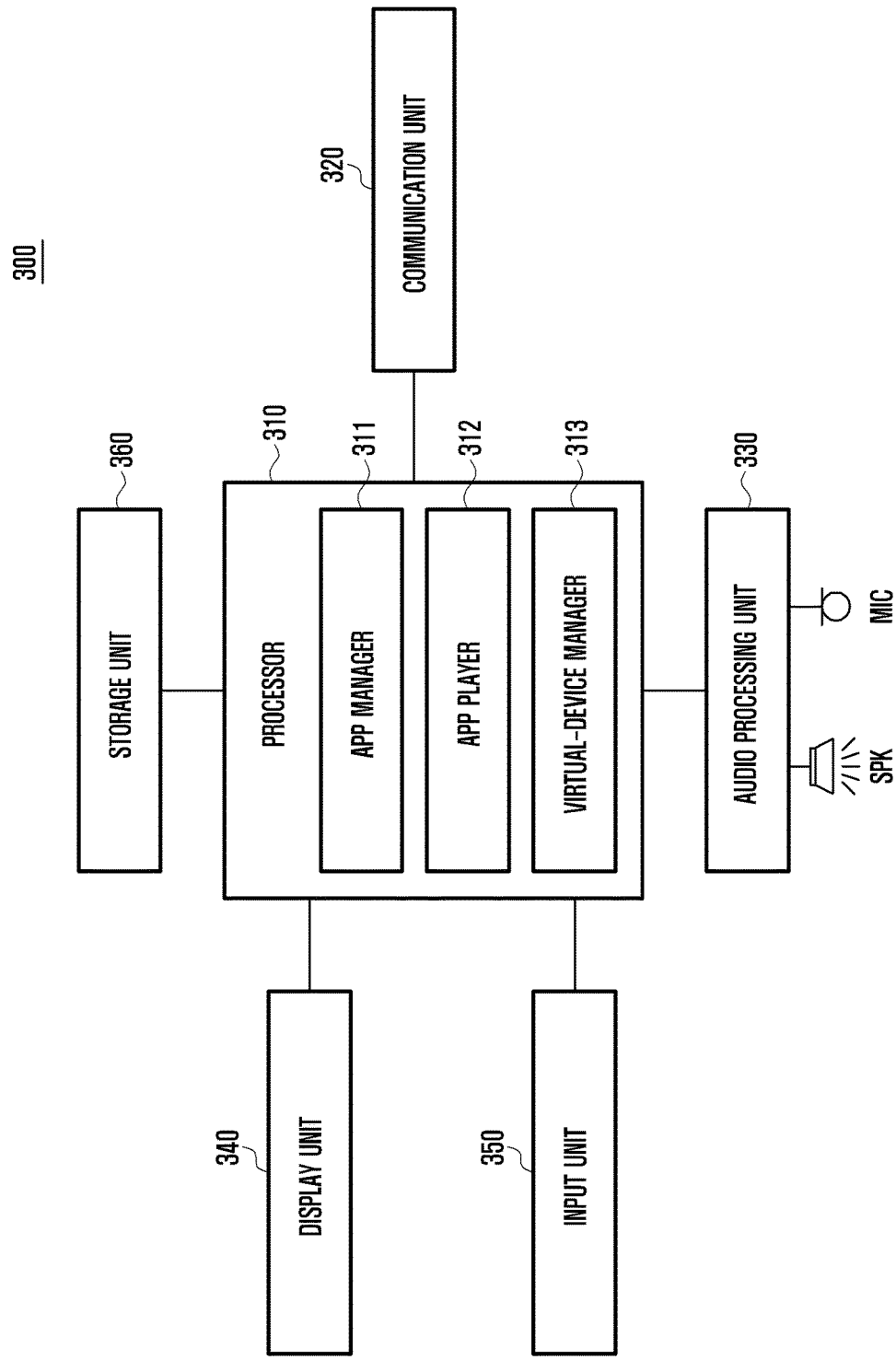
FIG. 3 is a diagram of an example of an electronic device, according to various embodiments.

FIG. 3 is a diagram of an example of an electronic device, according to various embodiments.

Referring to FIG. 3, the electronic device 300 may include a processor 310, a communication unit 320, an audio processing unit 330, a display unit 340, an input unit 350, and a storage unit 360.

The processor 310 may include any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), etc. The processor 310 may control the overall operation of the electronic device 300, a signal flow between internal elements of the electronic device 300, or the power supply from the battery to the elements, and may process data. The processor 310 may include an application processor (AP), a communication processor (CP), a graphic processing unit (GPU), and an audio processor. Here, the CP may be an element of the communication unit 320.

The processor 310 (e.g., the AP) may load commands or data received from at least one of non-volatile memories (for example, a secondary memory) or other elements in a volatile memory (for example, a main memory), and may process the same. In addition, the processor 310 may store data that is received from, or created by, one or more elements in a non-volatile memory.

The processor 310 may include an App manager 311, an App player 312, and a virtual-device manager 313. The App manager 311 may receive a request for the installation, deletion, or execution of the application through the input unit 350. The App manager 311 may transmit the request to the virtual-device manager 313. The App manager 311 may include a local App downloader, an App uploader, an App installer client, and an App remover. For example, when a request for the installation of the application is received from the user, the local App downloader may download the data related to the installation of the application from an application marketplace. The App manager 311 may separate the downloaded application into an application client and an application host, and may install the application client in the electronic device. In addition, the App manager 311 may receive an application ID and an application installation address from the virtual-device manager 313, and may install the application host in the virtual system 240 through the App installer client based on the application installation address. In addition, when the application is deleted, the App manager 311 may receive an application ID and an application deletion address from the virtual-device manager 313, and may delete the application client, which provides the UI, from the storage unit 360, based on the application deletion address.

When a request for creating the virtual device is received from the user, the virtual-device manager 313 may transmit an account associated with the electronic device 300 to the entitlement server 120. The virtual-device manager 313 may receive an authorization key from the entitlement server 120 in response to the account transmission. The virtual-device manager 313 may transmit a request to the virtual device manager server 120 for creating the virtual device based on the authorization key. When the virtual-device manager 313 receives a request for the installation of the application from the App manager 311, the virtual-device manager 313 may transmit to the virtual device manager server 130 a request for available platform information. In some implementations, the request may be transmitted through the entitlement server 120. More particularly, the virtual-device manager 313 may transmit a virtual device ID, an application file name to be installed, or platform information to the entitlement server 120 as part of the request. In response to the request, the virtual-device manager 313 may receive an application ID and an application installation address from the virtual device manager server 130 through the entitlement server 120. Afterwards, the virtual-device manager 313 may transfer the application ID and the application installation address to the App manager 311.

Additionally or alternatively, when the virtual-device manager 313 receives a request for the deletion of the application from the App manager 311, the virtual-device manager 313 may transmit the application ID of the application to the entitlement server 120. The virtual-device manager 313 may then receive a deletion address from the entitlement server 120. The virtual-device manager 313 may transmit the deletion address to the App manager 311.

Additionally or alternatively, when the virtual-device manager 313 receives a request for the execution of the application from the App manager 311, the virtual-device manager 313 may transmit the application ID of the application to the entitlement server 120. The virtual-device manager 313 may receive, from the entitlement server 120, a service address and a local address for executing the application together with the authorization key. Afterwards, the virtual-device manager 313 may forward the service address and the local address to the App player 312.

When the application is executed, a local storage manager in the electronic device 300 and a resource manager of the virtual device manager server 130 may be connected to each other via FTP (and/or any other suitable type of communications protocol). When a request for using local resources in the electronic device 300 is received, the virtual-device manager 313 may share resources that are stored in the storage unit 360 (e.g., data, files, or the like) with the virtual device manager server 130. The storage unit 360 may include any suitable type of volatile or non-volatile memory, such as Random-access Memory (RAM), Read-Only Memory (ROM), Network Accessible Storage (NAS), cloud storage, a Solid State Drive (SSD), etc. For example, the storage unit 360 may be an internal memory of the electronic device 300, or may be an external memory associated with the electronic device 300.

For example, when the application is executed, a virtual disk drive (L:) may be displayed in the form of an icon on the display unit 340. When the user clicks on the virtual disk drive, the application folders of the electronic device 300 and application folders of the virtual device manager server 130 may be synchronized. In some implementations, the synchronization may be a one-way synchronization in which the data is transmitted from the electronic device 300 to the virtual device manager server 130 by using the local address.

The App player 312 may control the execution of the application. The App player 312 may include an App selector and an App player. In operation, the App selector may deliver the service address, the local address, and the authorization key to the App player 312. The App player 312 may then operate the application based on the service address. More particularly, the App player 312 may access the virtual system 240 through the service address, and may receive an application execution image from the virtual system 240. Afterwards, the App player 312 may display the same on the display unit 340.

The communication unit 320, under the control of processor 310, may perform voice calls, video calls, or data communication with external devices (for example, other electronic devices, or servers) through a network (e.g., a mobile communication network, such as LTE, or a wireless/wired LAN). The communication unit 320 may include a radio-frequency transmitter that up-transforms and amplifies the frequency of a transmitted signal, and a radio-frequency receiver that low-noise-amplifies and down-transforms the frequency of a received signal. The communication unit 320 may include a cellular module {e.g., a communication module for providing voice calls, video calls, a text messaging service, or the Internet service through networks (e.g., LTE, LTE-A, CDMA, WCDMA, UMTS, WiBro, or GSM), a digital broadcasting module (e.g., a DMB module), or a short-range communication module {e.g., a Bluetooth module, or an NFC (Near Field Communication) module}.

The audio processing unit 330 may output voices under the control of the processor 310. The audio processing unit 330 is associated with a speaker (SPK) and a microphone (MIC) in order to thereby perform the input and output of audio signals (e.g., voice data) for speech recognition, audio recording, digital recording, or phone-calls. The speaker converts audio signals received from the processor 310 to sound waves to be output. The microphone converts sound waves transmitted from the people or other sound sources to audio signals. That is, the audio processing unit 330 may receive audio signals from the microphone or the communication unit 320, D/A-convert the received audio signals to analog signals, amplify the signals, and output the same through the speaker.

The display unit 340 may display a variety of information under the control of the processor 310. The display unit 340 may include a display panel or a hologram device. The display panel, for example, may be an LCD (Liquid Crystal Display), or an AM-OLED (active matrix organic light-emitting diode). The display panel, for example, may be implemented to be flexible, transparent, or wearable. The hologram device may show a three-dimensional image in the air by using the interference of light. The display panel may include a "touch panel" that is an input unit for the interaction between the user and the electronic device 300. Accordingly, in some implementations, the display unit 340 may be a touch screen.

The touch panel may be configured in the add-on type in which the touch panel is positioned on the screen of the display unit 340, or in the on-cell type or in-cell type in which the touch panel is provided inside the display unit 340. The touch panel, for example, may detect a user input in at least one of a capacitive method, a resistive method, an infrared method, or an ultrasonic method, and may create an event corresponding to the user input to then be transmitted to the processor 310. The user input may include a touch input by using electronic pens or a part of a user's body, a gesture input, a proximity input, or a hovering input. The touch panel may detect a conductive object (e.g., a finger or stylus) that directly touches the screen, or that approaches or hovers over the screen within a predetermined distance. The touch panel may create an event corresponding to the detected gesture, and may transfer the same to the processor 310.

The input unit 350 is different from the touch panel of the display unit 340, and, for example, may include a touch key. The touch key may detect touches or the proximity of a body or object. The input unit 350 may create an event in response to the user input, and may transmit the same to the processor 310. The input unit 350 may further include a key in another type (e.g., a dome key) as well as the touch type. For example, when the user presses on a dome key, the dome key is deformed to then contact a printed circuit board so that an event may be created from the printed circuit board to then be transferred to the processor 310.

The storage unit 360, under the control of the processor 310, may store data that is created in the electronic device 300 or that is received from one or more external devices. That is, the storage unit 360 may store the authorization keys, the virtual device IDs, or the application IDs. In addition, the storage unit 360 stores a boot program, one or more operating systems, and applications. The storage unit 360 may include a main memory and a secondary memory. The main memory, for example, may be implemented as a RAM. The secondary memory may be implemented as a disk, a RAM, a ROM, or a flash memory. The main memory, for example, may include various programs loaded from the secondary memory, such as a boot program, an operating system (e.g., the kernel), middleware, an API (Application Programming Interface), or applications.

When the power is supplied to the processor 310 from a battery, the boot program may be loaded into the main memory first. The boot program may load the operating system in the main memory. The operating system may load the application in the main memory. The processor 310 may access the main memory in order to decode commands (routine) of the program and in order to execute a function according to the decoded result. The storage unit 360 may further include an external memory. For example, the storage unit 360 may include the external memory, such as CF (Compact Flash), SD (Secure Digital), Micro-SD (Micro Secure Digital), Mini-SD (Mini Secure Digital), xD (Extreme Digital), or Memory Stick.

Figure 4:
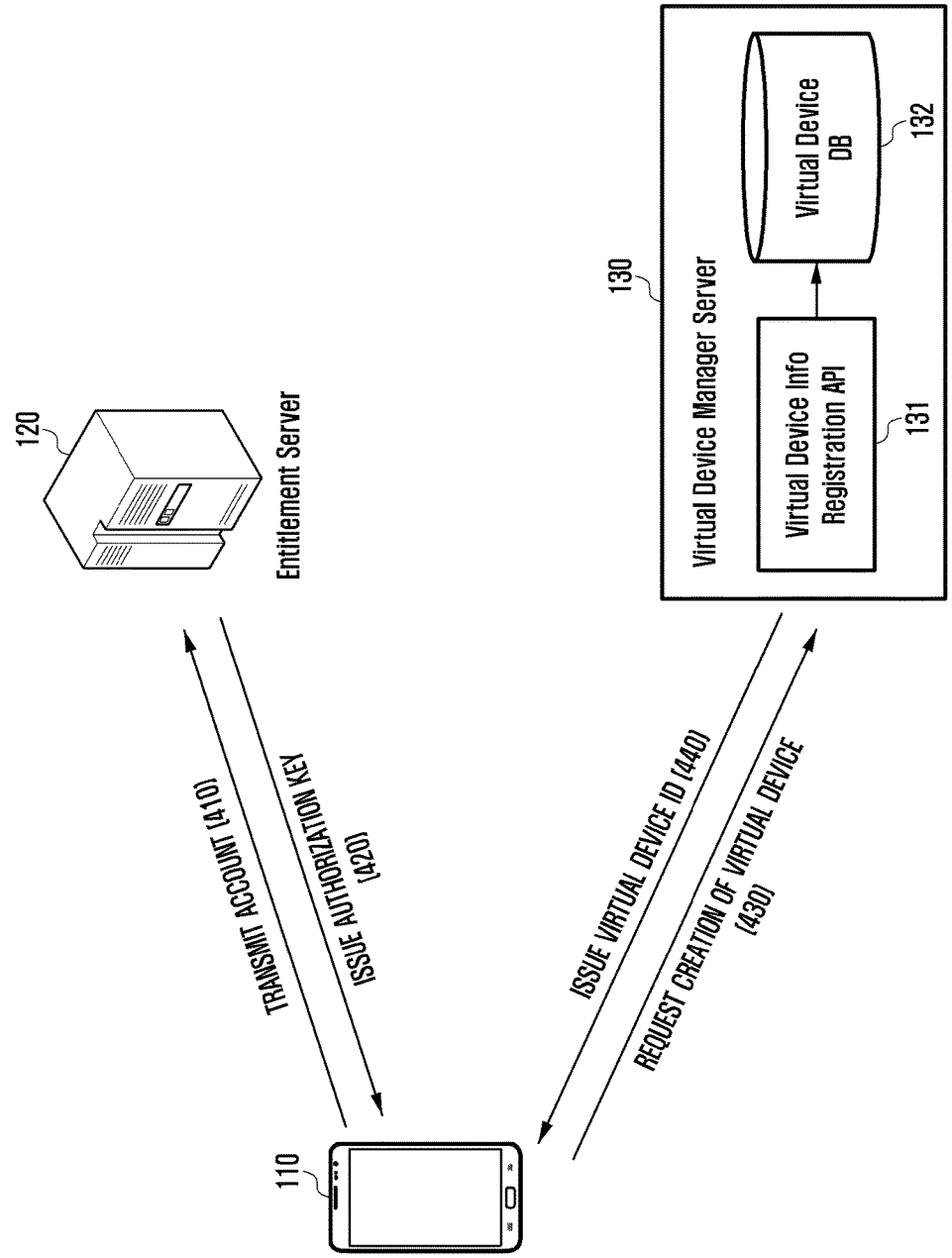
FIG. 4 is a diagram illustrating a process for registering a virtual device, according to various embodiments.

FIG. 4 is a diagram illustrating a process for registering the virtual device, according to various embodiments.

Referring to FIG. 4, in operation 410, in order to execute the application regardless of the platform of the electronic device 110 according to the user's request, the electronic device 110 may transmit a request to the entitlement server 120 for a service. The service request is intended to obtain authority for registering the virtual device. To this end, the electronic device 110 may transmit to the entitlement server 120 an indication of an account that is allocated to the electronic device 110.

The entitlement server 120 may receive the service request that contains the account associated with the electronic device 110, and may determine that the service request is for the registration of the virtual device. The entitlement server 120 may then determine whether or not the account associated with the electronic device 110 is valid in order to authorize the electronic device 110 to register the virtual device. If the account is valid, the entitlement server 120 may issue an authorization key to the electronic device 110 in operation 420.

When issuing the authorization key, the entitlement server 120 may provide the electronic device 110 with access information for accessing the virtual device manager server 130.

In operation 430, the electronic device 110 may transmit a request to the virtual device manager server 130 for creating the virtual device. According to aspects of the disclosure, the request may include the authorization key, and it may be transmitted by using the access information.

In operation 440, the virtual device manager server 130 may receive the request for creating the virtual device, and may issue a virtual device ID to the electronic device 110 in response to the request. The virtual device manager server 130 may include a virtual device info registration API 131 and a virtual device DB 132 (e.g., the database 220 of FIG. 2). The virtual device info registration API 131 may issue the virtual device ID based on the authorization key. The virtual device info registration API 131 may map the authorization key to the virtual device ID, and may store the same in the virtual device DB 132. For example, the virtual device manager server 130 may issue a single virtual device ID to a single electronic device, or may issue a plurality of virtual device IDs to a single electronic device.

The electronic device 110 may receive the virtual device ID from the virtual device manager server 130 in response to the virtual device creation request. The electronic device 110 may store the authorization key and the virtual device ID in its storage unit.

Figure 5:
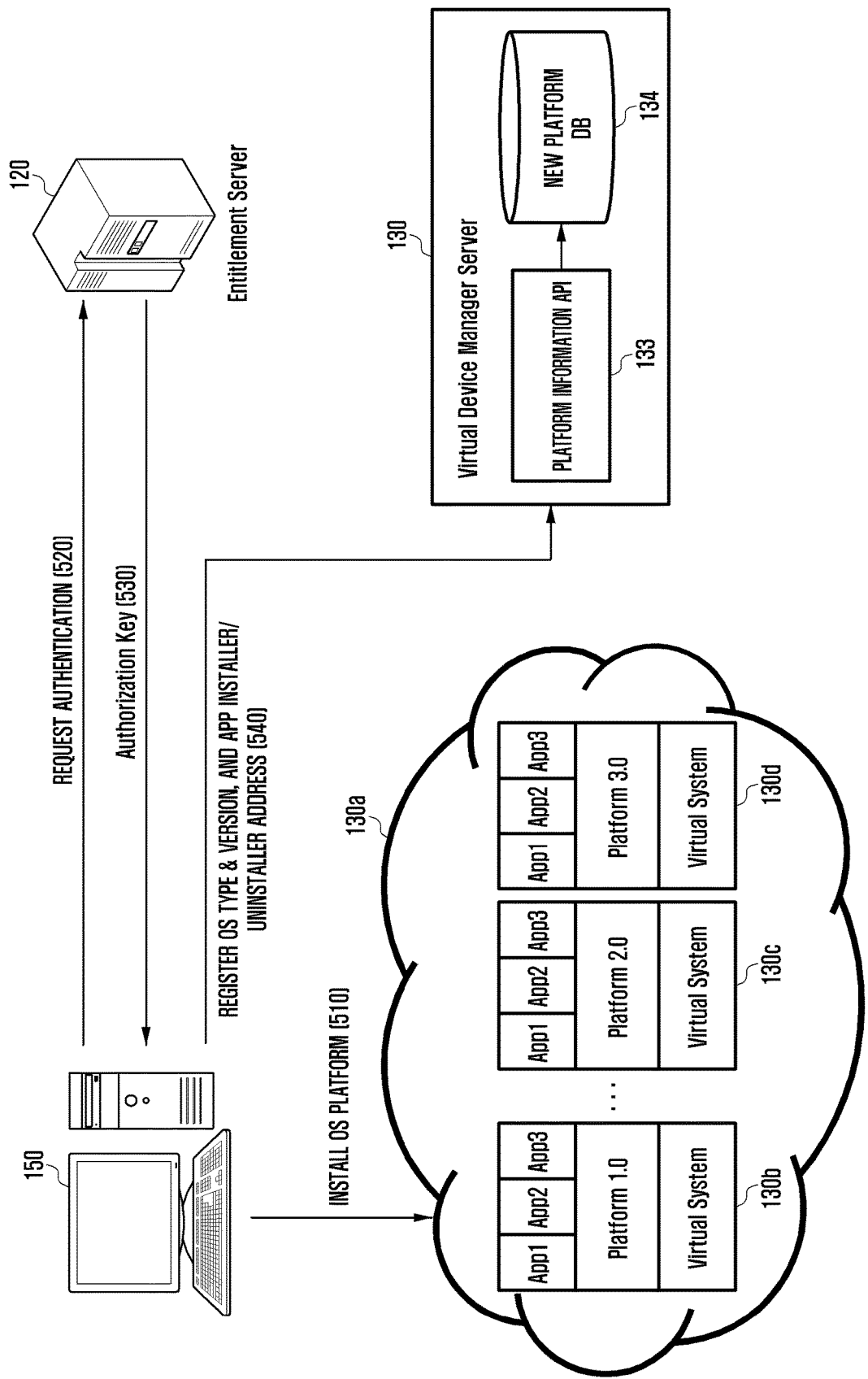
FIG. 5 is a diagram illustrating a process for installing a platform in a virtual system, according to various embodiments.

FIG. 5 is a diagram illustrating a process for installing a platform in the virtual system, according to various embodiments.

Referring to FIG. 5, when a new platform is released, in operation 510, a platform provider 150 may transmit a request to the virtual device manager server 200 for the installation of the new platform. In operation 520, the platform provider 150 may transmit a request for authentication to the entitlement server 120. When requesting the authentication, the platform provider 150 may transmit, to the entitlement server 120, a platform provider ID that has been uniquely allocated to the platform provider 150. In some implementations, the platform provider ID may be transmitted as part of the request.

In operation 530, the entitlement server 120 may authenticate the platform provider 150 based on the platform provider ID, and if the platform provider is successfully authenticated, the entitlement server 120 may transmit an authorization key to the platform provider 150. Furthermore, in some implementations, along with the authorization key, the entitlement server 120 may also transmit to the platform provider 150 access information for accessing the virtual device manager server 130. The access information may be an installation address in order to install the new platform.

In operation 540, the platform provider 150 may register the installation information associated with the new platform in the virtual device manager server 130, based on the installation address. In some implementations, the platform provider 150 may transmit to the virtual device manager server 130 the installation information together with the authorization key. The installation information may include the type, the version, or files of the new platform.

The virtual device manager server 130 may receive the installation information associated with the new platform through the installation address, and may install the new platform in the virtual system. The virtual device manager server 130 may include a platform information API 133 and a new platform DB 134 (for example, the database 220 of FIG. 2). The platform information API 133 may store the information associated with the new platform in the new platform DB 134 by using the installation information associated with the new platform.

Figure 6:
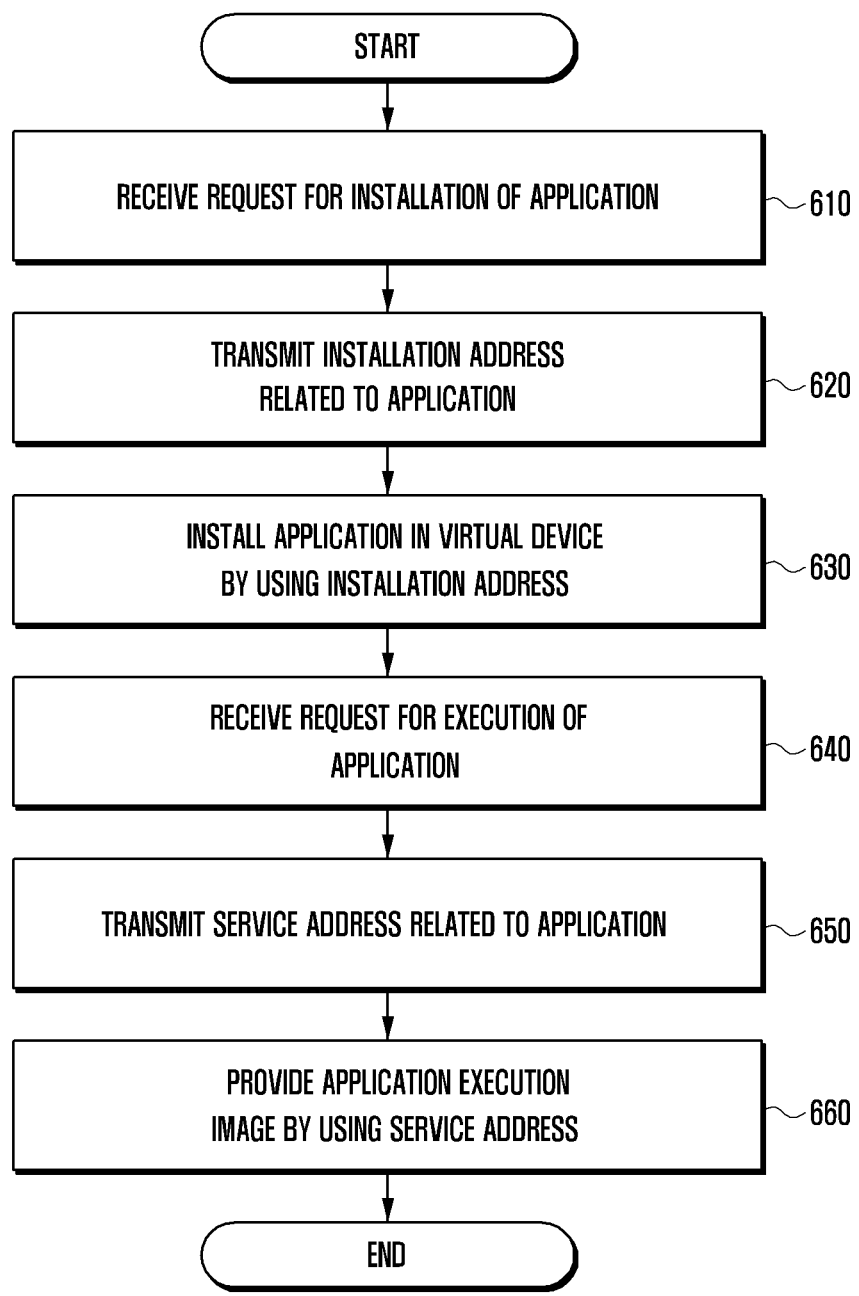
FIG. 6 is a flowchart of an example of a process, according to various embodiments.

FIG. 6 is a flowchart of an example of a process, according to various embodiments.

Referring to FIG. 2 and FIG. 6, in operation 610, the controller 210 may receive, from the electronic device 110, a request for the installation of an application for a specific platform, which contains a virtual device ID. The controller 210 may receive, via the communication unit 230, installation information associated with the application to be installed together with the virtual device ID. The installation information may include platform information and an application file name for the execution of the application.

In operation 620, the controller 210 may provide the electronic device 110 with an installation address (e.g., the FTP) in order to install the application. At this time, the controller 210 may authenticate the electronic device 110, and if the electronic device 110 is successfully authenticated, the controller 210 may provide the installation address for the installation of the application. The controller 210 may receive the installation information, and may allocate an application ID based on the installation information. According to aspects of the disclosure, the application ID may identify one or more of the platform for executing the application and the application itself. The controller 210 may transmit the allocated application ID as well as the installation address.

In operation 630, the controller 210 may install the application in the virtual device by using the installation address. For example, the controller 210 may install an application host for the requested application on the requested platform. In addition, the electronic device 110 may install an application client for providing a UI for the application.

In operation 640, the controller 210 may receive, from the electronic device 110, a request for the execution of the application. In some implementations, the request may include one or more of platform information, the application ID, and the virtual device ID.

In operation 650, the controller 210 may transmit, to the electronic device 110, a service address related to the application whose execution is requested. At this time, the controller 210 may authenticate the electronic device 110, and if the validity is confirmed, may provide the service address for the execution of the application. The service address is intended for the connection with the virtual system that is able to execute the requested application.

In operation 660, the controller 210 may provide an application execution image to the electronic device 110 through the service address. The electronic device 110 may receive the application execution image through the service address and display it on the display unit. Thus, the electronic device 110 may easily execute the desired application without changing the platform or locally installing the application of a platform that is different from that of the electronic device 110.

Figure 7:
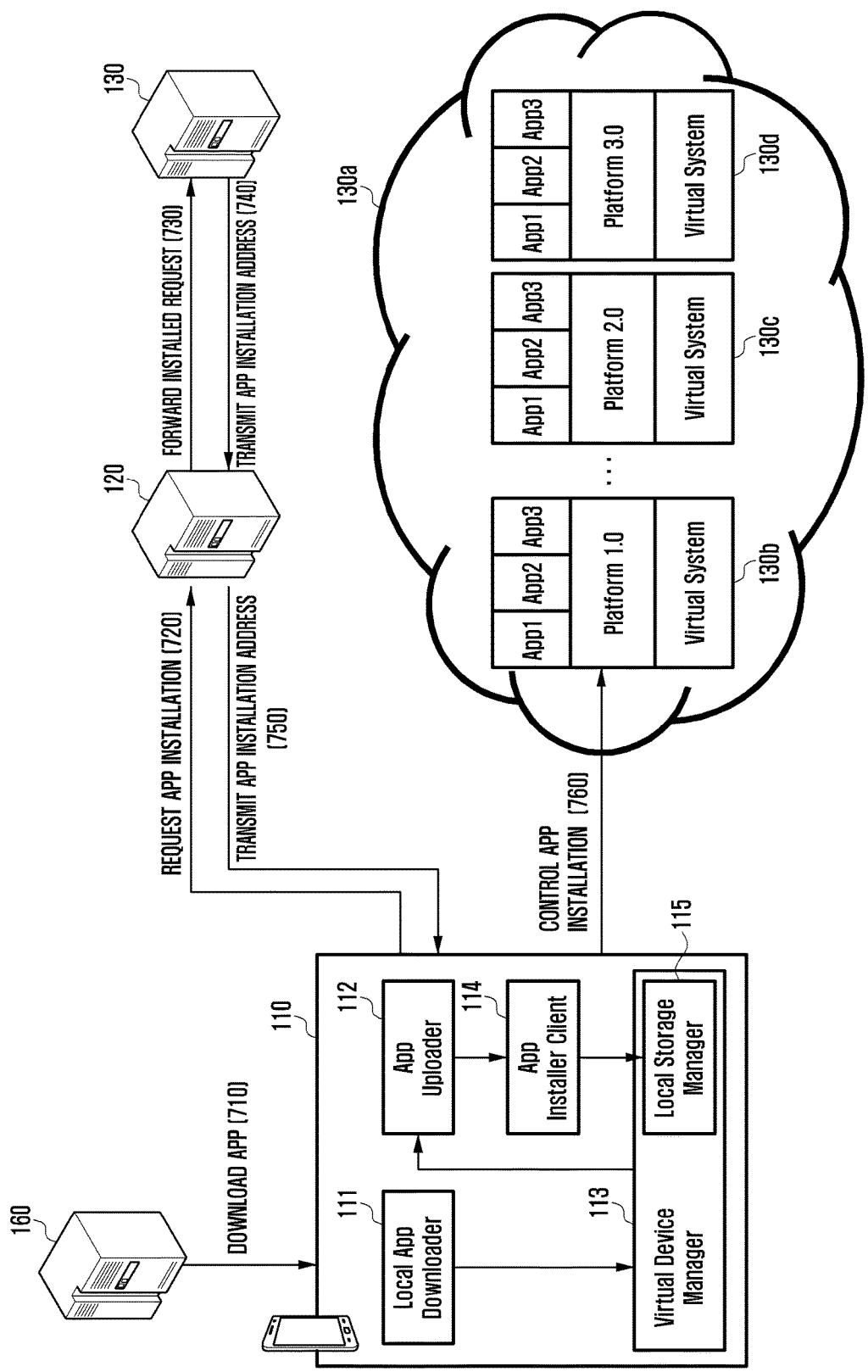
FIG. 7 is a diagram illustrating a process for installing an application in a virtual system, according to various embodiments.

FIG. 7 is a diagram illustrating a process for installing an application in a virtual system, according to various embodiments.

Referring to FIG. 7, an application developer may register, in an application marketplace, an existing application package that contains an application host module and an application client module. The user may browse the application marketplace, and may request the installation of an application that is executable on a platform that is not natively supported by the user's electronic device 110.

In operation 710, the electronic device 110 may download the application from the application marketplace 160 according to the user's request. At this time, the electronic device 110 may include a local App downloader 111, an App uploader 112, a virtual device manager 113, an App installer client 114, and a local storage manager 115. Afterwards, an application installation request may be forwarded to the virtual device manager 113, and the virtual device manager 113 may transmit a request to the virtual device manager server 130 for information associated with the platform on which the application can be executed.

In addition, in operation 720, the virtual device manager 113 may transmit the application installation request to the entitlement server 120. At this time, the virtual device manager 113 may transmit a virtual device ID, an application file name, or platform information together with the application installation request.

In operation 730, the entitlement server 120 may receive the installation request, and may forward the same to the virtual device manager server 130. More particularly, in some implementations, the entitlement server 120 may transmit the received virtual device ID, application file name, or platform information to the virtual device manager server 130.

In operation 740, the virtual device manager server 130 may transmit, to the entitlement server 120, an installation address for the installation of the application. The virtual device manager server 130 may allocate an application ID based on the virtual device ID, the application file name, or the platform information. The virtual device manager server 130 may then transmit, to the entitlement server 120, the application ID together with the installation address (the App installer address).

In operation 750, the entitlement server 120 may transmit the installation address to the electronic device 110.

In operation 760, the electronic device 110 may control the installation of the application based on the installation address. For example, the App uploader 112 may receive the installation address and the application ID, and may forward the installation address and the application ID to the App installer client 114. The App installer client 114 may install the application file on the platform of the virtual system based on the installation address. During the installation, the virtual device manager server 130 may create a folder structure, such as 'Account>virtual device ID>App ID,' in the database 140. When the App host module is installed in the virtual system, the electronic device 110 may install the App client and may end the installation process. The local storage manager 115 may create a local folder for the installed application (the internal storage unit of the electronic device 110, or an external storage unit connected with the electronic device 110) as 'Account>virtual device ID>App ID.' Additionally or alternatively, the local storage manager 115 may create a folder structure, such as 'virtual device ID>platform+application file name>Application ID>App URL+virtual device local URL.'

Figure 8:
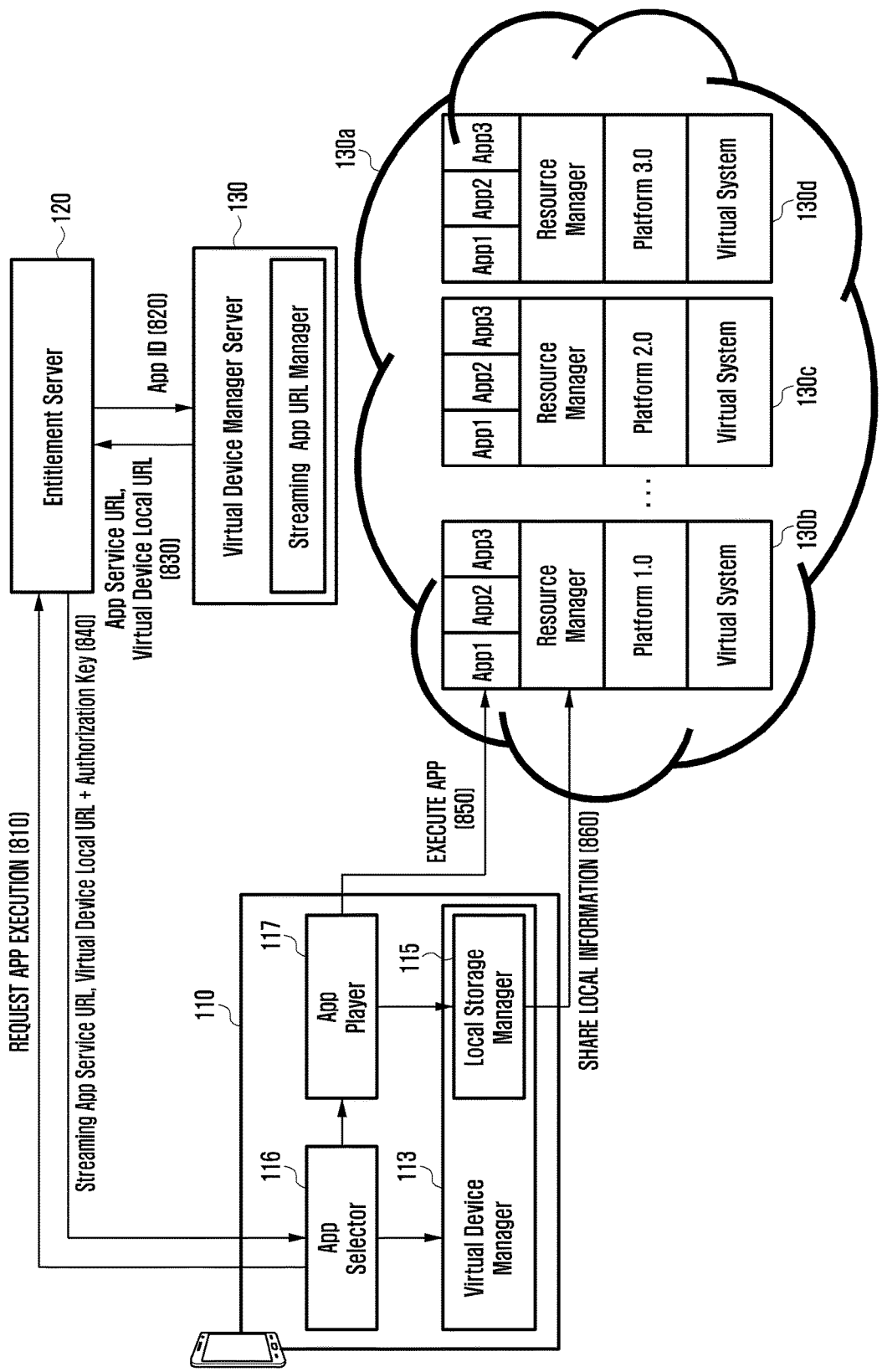
FIG. 8 is a diagram illustrating a process for executing an application, according to various embodiments.

FIG. 8 is a diagram illustrating a process for executing an application, according to various embodiments.

Referring to FIG. 8, when the user executes an application in the electronic device 110, in operation 810, the electronic device 110 may transmit an application execution request to the entitlement server 120. In some implementations, the request may include an identifier of an account associated with the electronic device and an application ID associated with the application.

In operation 820, the entitlement server 120 may receive the application ID, and may forward the same to the virtual device manager server 130.

In operation 830, the virtual device manager server 130 may transmit a service address for executing the application to the entitlement server 120. The service address may be obtained by the virtual device manager server 130 based on the application ID. For example, the virtual device manager server 130 may transmit an APP service URL, and a virtual device local URL to the entitlement server 120. The APP service URL may include a service address for the connection with the virtual system that is able to execute the application. The virtual device local URL may include a local address by which the virtual system may access local files stored in the electronic device 110. For example, in some implementations, the virtual system may pre-configure a path through which the local files stored in the electronic device 110 may be uploaded.

In operation 840, the entitlement server 120 may transmit the App service URL, the virtual device local URL, and an authorization key to the electronic device 110.

In operation 850, the electronic device 110 may receive the App service URL, the virtual device local URL, and the authorization key, and may execute the application based on the App service URL. The App service URL, the virtual device local URL, and the authorization key may be provided to an App selector 116 of the electronic device 110. The App selector 116 may then forward the App service URL, the virtual device local URL, and the authorization key to an App player 117. Afterwards, the App player 117 may execute the application based on the App service URL.

If resources are required in the electronic device 110 when executing the application, in operation 860, a streaming application may be shared with a virtual system 130a, in which a plurality of applications are installed, which are executable in a plurality of platforms, through the virtual device manager 113 of the electronic device 110. Additionally or alternatively, the local storage manager 115 may be configured as a sub-module of the virtual device manager 113. For example, the virtual system 130a may store and manage the applications and application data, and the files in the electronic device 110 may be shared with the virtual system 130a as well. Additionally or alternatively, the virtual device manager 113 may manage the virtual device information and the platform information, which are registered in the virtual device manager server 130 and the virtual system 130a, and app client information installed in the electronic device 110. The local storage manager 115 may transmit, to the virtual system 130a, files that are stored in the storage unit of the electronic device 110. At this time, the electronic device 110 and the virtual system 130a may upload and share resources in the electronic device 110 through the local address.

Figure 9:
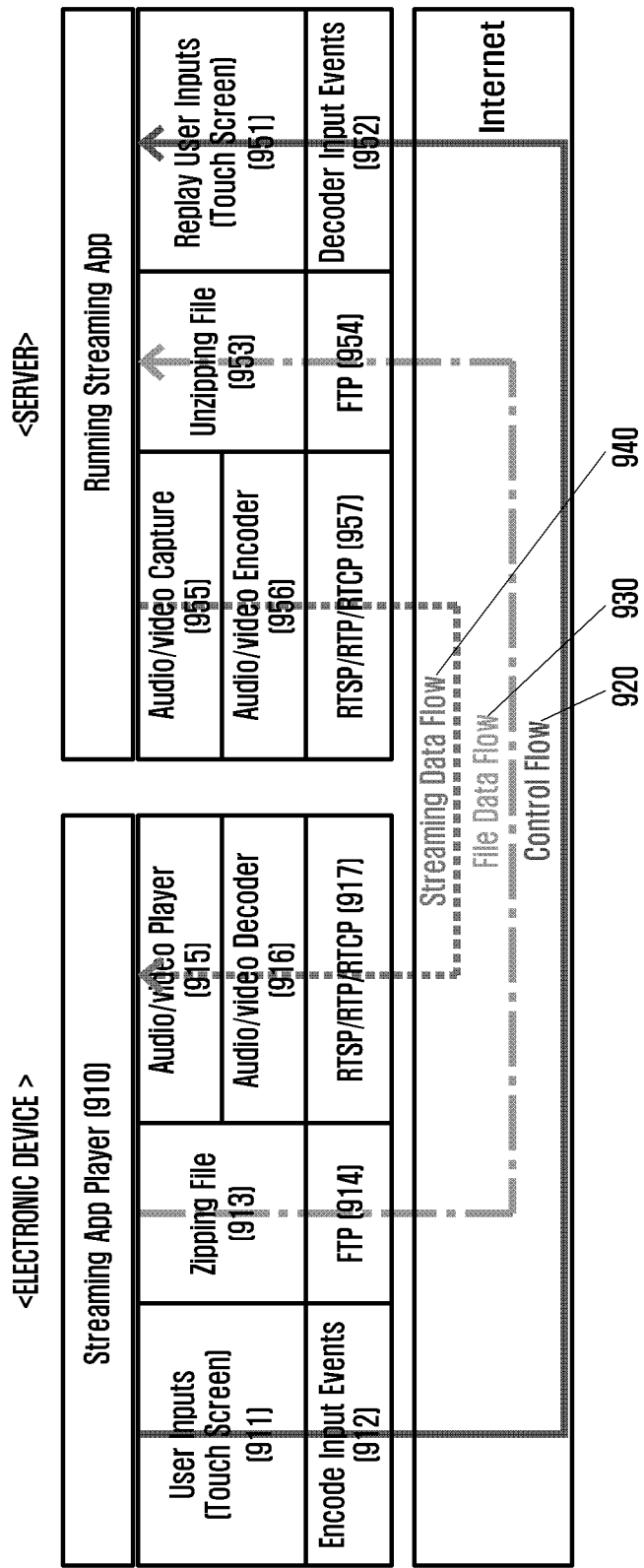
FIG. 9 is a diagram illustrating an example of a communication flow between an electronic device and a server, according to various embodiments.

FIG. 9 is a diagram illustrating an example of a communication flow between the electronic device and the server, according to various embodiments.

Referring to FIG. 9, the communication between the electronic device and the server may be performed through an App player 910 in the electronic device and a streaming App that is executed by the virtual device manager server 130. A control command for user inputs may be made according to the control flow 920. For example, the electronic device 110 may encode a user input 911 received through a touch screen (encode input events 912), and may transmit the same to a streaming application host in the virtual system through the Internet (or another type of communications network). The streaming application host installed in the virtual system may decode the transmitted user input (decode input events 952) in order to recognize the user input 951.

In addition, the file transmission may be performed by using a file data flow 930. For example, the electronic device 110 may compress the file (zipping file 913), and may transmit the compressed file by the FTP client/server 914 to the streaming application host installed in the virtual system. The virtual device manager server 130 may receive the compressed file by the FTP client/server 954, and may decompress the file (unzipping file 953) in order to thereby recognize the file.

In addition, the transmission of information related to the execution of the application (e.g., voice, audio, or video data) may be made through the streaming data flow 940. For example, the streaming application host installed in the virtual system may capture audio or video data (audio/video capture 955) to encode the same 956, and then, may transmit the same to the electronic device 110 through RTSP/RTP/RTCP clients/servers 957. The electronic device 110 may receive the encoded audio or video data through the RTSP/RTP/RTCP clients/servers 917, and may decode the same 916 to then be output to an audio/video player 915.

Figure 10:
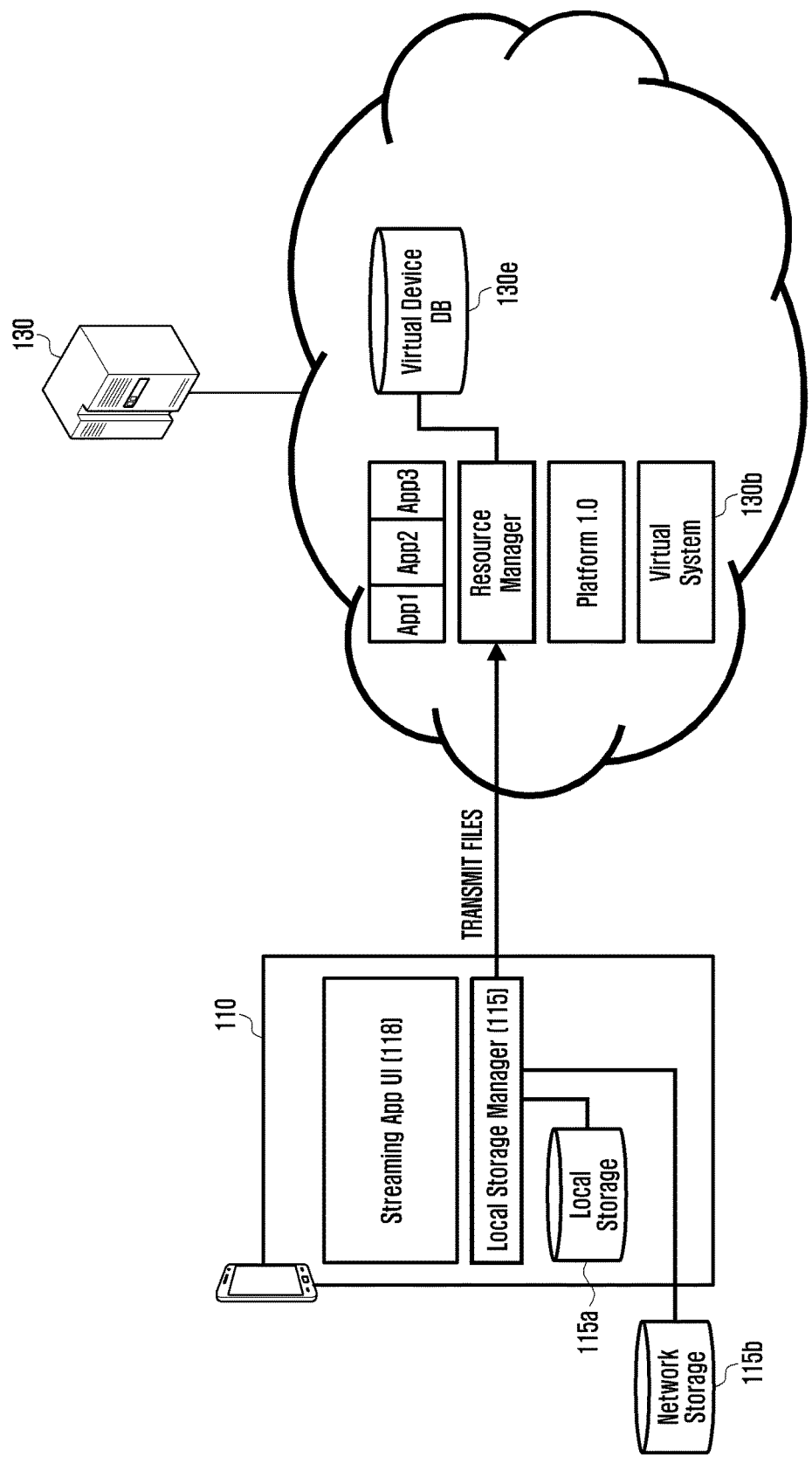
FIG. 10 is a diagram illustrating a process for transmitting files to a virtual system, according to various embodiments.

FIG. 10 illustrates an example of a process for transmitting files to a virtual system, according to various embodiments.

Referring to FIG. 10, when the application is executed, the local storage manager and the resource manager may be connected to each other via FTP. When executing the application, an App UI 118 in the electronic device 110 may display an icon associated with a virtual disk drive (L:) on the display unit. When the user clicks on the icon, the App folder of the electronic device 110 and the App folder of the virtual device manager server 130 may be synchronized. More particularly, the local storage manager 115 may transmit, to the virtual system, files stored in a local storage 115a of the electronic device 110 or in an external network storage 115b that is connected to the electronic device 110. When a local network address in the local network to which the electronic device 110 belongs, is input into the electronic device 110, the local storage manager 115 may synchronize the App folders between the network storage 115b and the virtual device manager server 130. For example, when the user selects a file, the local storage manager 115 may compress the file before transmitting it via FTP to the virtual device manager server 130. When the streaming application host installed in the virtual system receives the compressed file, the resource manager may decompress the compressed file and store it in a virtual device DB 141a.

Figure 11:
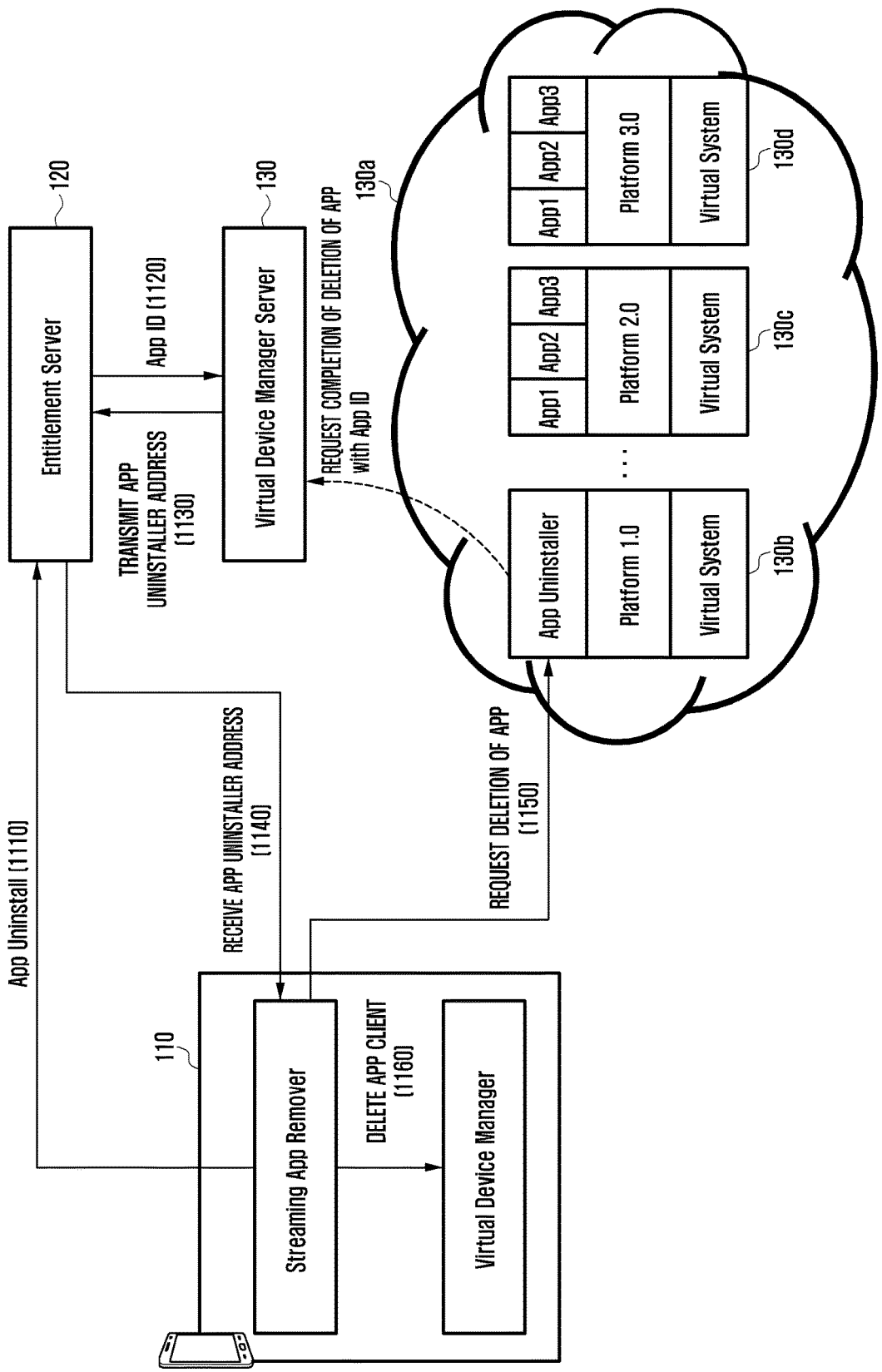
FIG. 11 is a diagram illustrating a process for deleting an application in a virtual system, according to various embodiments.

FIG. 11 is a diagram illustrating a process for deleting the application in the virtual system, according to various embodiments.

Referring to FIG. 11, in operation 1110, when the electronic device 110 receives a request for the deletion of the application from the user, the electronic device 110 may transmit a request to the entitlement server 120 for deleting (and/or uninstalling) the application. More particularly, in some implementations, the request may include an identifier of an account associated with the electronic device 110 and an application ID corresponding to the application.

In operation 1120, the entitlement server 120 may receive the application deletion request containing the application ID, and may forward the application ID to the virtual device manager server 130. The virtual device manager server 130 may receive the application ID, and may validate the application ID. For example, the virtual device manager server 130 may determine whether an application is installed that is associated with the application ID.

In operation 1130, if the application ID is successfully validated, the virtual device manager server 130 may transmit a deletion address (App uninstaller) for the deletion of the application to the entitlement server 120. The deletion address may include a URL for connecting to the virtual system in which the application host requested to be deleted is installed. The entitlement server 120 may then transmit the deletion address to the electronic device 110.

In operation 1140, the electronic device 110 may receive the deletion address. An App remover 119 in the electronic device may call a streaming App uninstaller address by using the application ID. In operation 1150, when the deletion of the application is completed through the uninstaller, the App remover 119 may transmit an App deletion request containing the application ID to the virtual device manager server 130. In response to the deletion request, the App uninstaller of the virtual system may delete the application host corresponding to the application ID.

In operation 1160, the App Remover 119 in the electronic device 110 may transmit a request to the virtual device manager 115 for the deletion of the App client. That is, when the deletion of the application host is completed in the virtual system, the electronic device 110 may delete the App client in order to t complete the deletion of the application.

FIGS. 1-11 are provided as an example only. At least some of the operations discussed with respect to these figures can be performed concurrently, performed in different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

In addition, the exemplary embodiments set forth in this document are suggested to explain and understand features disclosed therein, and do not limit the scope of the technical features set forth in this document. Therefore, the scope of this document should be construed as including all changes based on the technical idea of this document or other various exemplary embodiments.

What is claimed is:

1. An apparatus comprising:
   a memory;
   at least one processor operatively coupled to the memory, configured to:
   execute a plurality of platforms that are different from each other in at least one of type and version, each of the platforms being associated with one or more respective applications; and
   perform an operation including at least one of deleting a first platform, installing a second platform, deleting a first application from one of the platforms, and installing a second application in one of the platforms;
   wherein performing the operation includes:
   receiving, from an external device, a request for deleting the first application that contains an application ID associated with the first application;
   detecting whether the application ID is valid; and
   transmitting, to the external device, a deletion address for deleting the first application in response to detecting that the application ID is valid.

2. The apparatus of claim 1, wherein the at least one processor is further configured to:
   receive an indication of an account from an external device;
   detect whether the account is valid; and
   transmit an authorization key to the external device in response to detecting that the account is valid.

3. The apparatus of claim 2, wherein the at least one processor is further configured to:
   receive a request for registering a virtual device that contains the authorization key; and
   issue a virtual device ID based on the authorization key.

4. The apparatus of claim 3, wherein performing the operation includes:
   receiving, from the external device, a request for installing the second application that includes the virtual device ID and installation information associated with the second application;
   allocating an application ID based on the installation information; and
   transmitting, to the external device, the application ID and an installation address for installing the second application.

5. The apparatus of claim 1, wherein performing the operation includes:
   receiving, from an external device, a request for at least one of deleting the first platform or installing the second platform;
   authenticating the external device; and
   fulfilling the request in response to the external device being successfully authenticated.

6. The apparatus of claim 1, wherein the at least one processor is further configured to:
   receive, from an external device, a request for executing the second application that contains an application ID associated with the second application; and
   transmit, to the external device, a service address and a virtual device local address for executing the second application, in response to the request.

7. The apparatus of claim 6, wherein the at least one processor is further configured to:
   receive local files stored in the external device by using the virtual device local address; and
   store the local files in a location in the memory that is associated with the virtual device.

8. An electronic device comprising:
   a display;
   a memory; and
   at least one processor operatively coupled to the memory, configured to:
   execute an application client associated with an application;
   receive an application execution image from a virtual device manager server through a service address for executing the application; and
   display the application execution image on the display;
   wherein the at least one processor is further configured to:
   receive, from the virtual device manager server, an application ID and an application deletion address corresponding to the application; and
   delete the application client based on the application deletion address.

9. The electronic device of claim 8, wherein the at least one processor is further configured to:
   transmit an indication of an account to the virtual device manager server; and
   transmit a first request to the virtual device manager server for a virtual device ID based on an authorization key that is issued for the account.

10. The electronic device of claim 9, wherein the at least one processor is further configured to:
    transmit, to the virtual device manager server, a second request for installing the application, the second request containing the virtual device ID and application installation information associated with a platform;
    receive, from the virtual device manager server, an application ID and an application installation address corresponding to the application; and
    install the application client based on the application installation address.

11. The electronic device of claim 8, further comprising a storage unit that stores data or files, wherein the processor is further configured to synchronize the storage unit with the virtual device manager server by transmitting data or files stored in the storage unit to the virtual device manager server.

12. A method comprising:
executing a plurality of platforms that are different from each other in at least one of type and version;
receiving, from an external device, a request for executing an application associated with one of the platforms;
executing the application in response to the request for executing the application;
transmitting, to the external device, a service address for receiving an application execution image that is produced as a result of executing the application;
receiving, from the external device, a request for installing the application that contains a virtual device ID and installation information associated with the application;
allocating an application ID based on the installation information;
transmitting the application ID and an installation address to the external device; and
installing the application based on the installation address.

13. A method comprising:
executing a plurality of platforms that are different from each other in at least one of type and version;
receiving, from an external device, a request for executing an application associated with one of the platforms;
executing the application in response to the request for executing the application;
transmitting, to the external device, a service address for receiving an application execution image that is produced as a result of executing the application;
receiving, from the external device, a request for deleting the application, that contains an application ID associated with the application;
validating the application ID and transmitting to the external device a deletion address for deleting the application in response to application ID being validated; and
deleting the application in response to receiving one or more communications from the external device at the deletion address.

14. The method of claim 12, further comprising:
transmitting, to the external device, a virtual device local address for executing the application; and
receiving one or more local files that are stored in the external device at the virtual device local address.

15. A method for use in an electronic device, comprising:
transmitting, to a virtual device manager server, a request for executing an application, the request containing an application ID associated with the application,
receiving, from the virtual device manager server, a service address for executing the application in response to the request,
receiving an application execution image from a virtual system included in the virtual device manager server by using the service address;
displaying the application execution image on a display of the electronic device,
transmitting, to the virtual device manager server, a request for installing the application that contains a virtual device ID and installation information associated with the application;
receiving the application ID and an application installation address from the virtual device manager server in response to the request; and
installing an application client for displaying the application execution image by using the application installation address.

16. The method of claim 15, further comprising synchronizing the electronic device with the virtual device manager server by transmitting data or files stored in a storage unit of the electronic device to the virtual device manager server.

* * * * *